(12) United States Patent
Kang et al.

(10) Patent No.: US 6,463,302 B1
(45) Date of Patent: Oct. 8, 2002

(54) MULTI-SECTOR BASE STATION APPARATUS IN MOBILE COMMUNICATION SYSTEM

(75) Inventors: Hong Koo Kang, Seoul (KR); Min Young Ahn, Kyoungki-do (KR)

(73) Assignee: Hyundai Electronics Ind. Co., Ltd., Ichon-si (KR)

( * ) Notice: Subject to any disclaimer, the term of this patent is extended or adjusted under 35 U.S.C. 154(b) by 0 days.

(21) Appl. No.: 09/479,667

(22) Filed: Jan. 10, 2000

(30) Foreign Application Priority Data

Jan. 8, 1999 (KR) .............................. 99-00296

(51) Int. Cl.[7] ............................... H04B 1/00
(52) U.S. Cl. ..................... 455/562; 455/561; 455/443
(58) Field of Search ............................. 455/436, 437, 455/443, 444, 562, 561

(56) References Cited

U.S. PATENT DOCUMENTS

| | | |
|---|---|---|
| 5,327,577 A | 7/1994 | Uddenfeldt |
| 5,625,876 A | 4/1997 | Gilhousen et al. |
| 5,640,414 A * | 6/1997 | Blakeney, II et al. ....... 375/200 |
| 5,774,790 A * | 6/1998 | Dupuy ........................ 370/337 |
| 5,960,349 A * | 9/1999 | Chheda et al. .............. 455/446 |
| 6,127,972 A * | 10/2000 | Avidor et al. ............... 342/373 |
| 6,198,925 B1 * | 3/2001 | Lee ............................ 455/434 |
| 6,272,335 B1 * | 8/2001 | Nakayama et al. ......... 455/562 |

* cited by examiner

*Primary Examiner*—Edward F. Urban
*Assistant Examiner*—Sheila Smith
(74) *Attorney, Agent, or Firm*—Jacobson Holman, PLLC

(57) ABSTRACT

In the multi-sector base station apparatus of a mobile communication system, capable of realizing a six-sector base station apparatus by using a three-sector base station MODEM, a peripheral equipment controlling unit transfers a sector conversion control signal outputted from a CPU for controlling a sector switching of the base station, to a sector conversion controlling unit, and the sector conversion controlling unit generates a plural number of control signals for a sector conversion according to the inputted control signal and sector conversion data, and by this control signal, a sector converting unit performs a switching between sectors of a transmission signal from a base station MODEM and a reception signal transmitted from a mobile station, whereby the six-sector base station is realized through a use of the three-sector base station base station MODEM.

6 Claims, 3 Drawing Sheets

MULTI-SECTOR BASE STATION APPARATUS IN MOBILE COMMUNICATION SYSTEM

BACKGROUND OF THE INVENTION

1. Field of the Invention

The present invention relates to a base station of a mobile communication system as a digital cellular system(DCS) and a personal communication service (PCS), and more particularly, to a multi-sector base station apparatus of a mobile communication system to embody a six-sector base station apparatus by using a three-sector base station MODEM.

2. Discussion of Related Art

In general, it is obligated that a mobile communication system complies with a protocol regularized for a call process in the Electronic Industrial Association, and according to that, a terminal searches for a control channel of a base station as a cell site which has the largest signal intensity of a receiving signal, namely, which is nearest to its own position, in its initial state when power is applied to the terminal.

The nearest control channel is searched, then the mobile communication terminal becomes non-traffic mode and receives a message transmitted from the current base station through the selected channel.

At this time, the base station performs a communication service concerned with a general mobile communication work through a communication message with the terminal as the mobile station or a control station, together with the message mentioned above, and in such communicative work execution, a MODEM for use of the base station is used.

That is, data is transmitted and received through this MODEM in a data communication with the mobile station or with the control station.

Figure 1:
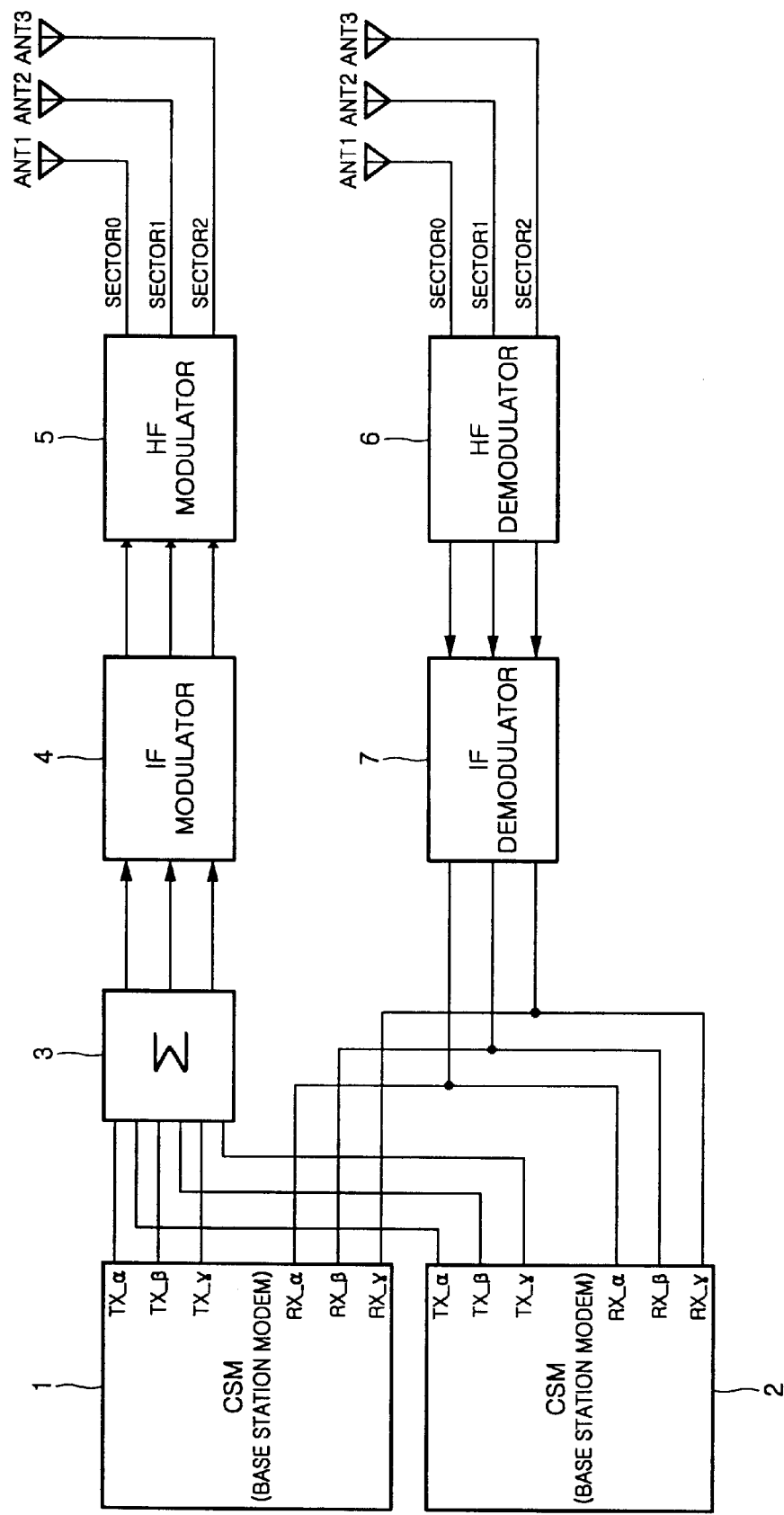

FIG. 1 provides a block diagram of a conventional three-sector base station apparatus for performing the communication with the mobile station by using this MODEM.

As shown in FIG. 1, the three-sector base station apparatus is constructed by first and second base station MODEMs 1,2 for generating data to be transmitted to the mobile station, e.g., α sector data, β sector data and γ sector data, and receiving data transmitted from the mobile station, namely, the α sector data, the β sector data and the γ sector data; a base station MODEM output digital combiner 3 for combining signals respectively generated in the first and second base station MODEMs 1,2, and outputting it; an intermediate frequency modulator 4 for modulating transmission data per individual sector into respective intermediate frequency signals, the transmission data being outputted from the base station MODEM output digital combiner 3; a high frequency modulator 5 for modulating intermediate frequency (IF) per each sector, which is gained in the intermediate frequency modulator 4, into each high frequency signal, and after that, outputting the signals to antennae ANT1,ANT2,ANT3 for respective sectors; a high frequency demodulator 6 for demodulating mobile station transmission high frequency(HF) received to the antenna ANT1,ANT2,ANT3 per each sector; and an intermediate frequency demodulator 7 for extracting the IF signals from the HF signals respectively demodulated in the HF demodulator 6 and transferring them to the first and second base station MODEMs 1,2 according to the individual sectors.

Operations of the conventional three-sector base station apparatus with such construction are as follows.

The transmission data outputted from the first and second base station MODEMs 1,2 according to the respective sectors is combined in the base station MODEM output digital combiner 3.

This base station MODEM output digital combiner 3 includes a serial/parallel conversion and output controller, a saturator and a data combiner, though they are not shown in the drawings. The serial/parallel conversion and output controller converts output data of the base station MODEM into parallel data, detects parity error of the converted parallel data and controls an output of each channel card according to its detection result. The saturator eliminates invalid information out of channel data outputted from the serial/parallel conversion and output controller, and passes only valid data. The data combiner selectively adds up the channel data outputted from the saturator according to individual channels and outputs only the valid information in which the invalid information is eliminated from the added channel data, as final output data.

Like this, the transmission data outputted from the base station MODEM output digital combiner 3 is modulated in to the IF per each sector in the IF modulator 4, and is then modulated into the HF per each sector in the HF modulator 5, and after that, is transmitted to the mobile station through the antenna ANT1,ANT2,ANT3.

Meantime, the signal transmitted from the mobile station is received to the antenna ANT1,ANT2,ANT3 per each sector, and is demodulated into an original signal in the HF demodulator 6. Then, the IF is extracted from this demodulated original signal in the IF demodulator 7 and is transferred as an actual reception signal to the first and second base station MODEMs 1, 2.

The conventional base station apparatus with such operations is the base station apparatus for use of three sectors, and in order to use it for use of six-sector base station, conventionally two three-sector base station apparatuses are combined to embody the six-sector base station apparatus, this three-sector base station apparatus being as that shown in FIG. 1.

However, like this, in a case of combining two three-sector base station apparatuses to embody the six-sector base station apparatus, a soft handoff occurs between specific sectors. Thus, two traffic channels should be allotted, which causes a drop in an efficiency of the traffic channel.

SUMMARY OF THE INVENTION

Accordingly, the present invention is directed to a multi-sector base station apparatus of a mobile communication system that substantially obviate one or more of the limitations and disadvantages of the related art.

A primary object of the present invention is to provide a multi-sector base station apparatus in a mobile communication system, which is capable of realizing a six-sector base station apparatus by using a three-sector base station MODEM, in order to settle a general problem caused in a six-sector base station apparatus provided by conventionally combining two base station apparatuses for use of three sectors.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, the six-sector base station is embodied by using a base station MODEM for use of three sectors, therefore a softer handoff between sectors occurs and a traffic channel being under a current speech in this softer handoff is allotted to other sector, to thereby heighten an efficiency of the traffic channel.

The inventive base station apparatus based on such technical spirit comprises a peripheral equipment controlling unit for transferring sector conversion control signals outputted from a central processing unit (CPU) for controlling an overall operation of a base station, to peripheral equipments; a sector conversion controlling unit for generating a number of control signals for a sector conversion according to the control signals and sector conversion data gained from the peripheral equipment controlling unit; and a sector converting unit for performing a switching for sectors of transmission signals from the base station MODEM and reception signals transmitted from a mobile station, in response to numerous control signals generated in the sector conversion controlling unit.

The sector converting unit transmits the transmission signals gained from the base station MODEM to six sectors, and receives, through six sectors, reception signals transmitted from the mobile station.

Further, the sector converting unit is composed of a transmitter for converting a three-sector signal outputted from the base station MODEM into a six-sector signal in response to numerous control signals outputted from the sector conversion controlling unit, and a receiver for converting a six-sector reception signal transmitted from the mobile station into a three-sector signal.

In addition, the transmitter is constructed by first through third demultiplexors for converting the three-sector signal outputted from the base station MODEM into the six-sector signal.

The receiver is also constructed by first through third multiplexors for converting the six-sector reception signal transmitted from the mobile station into the three-sector signal.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 2:
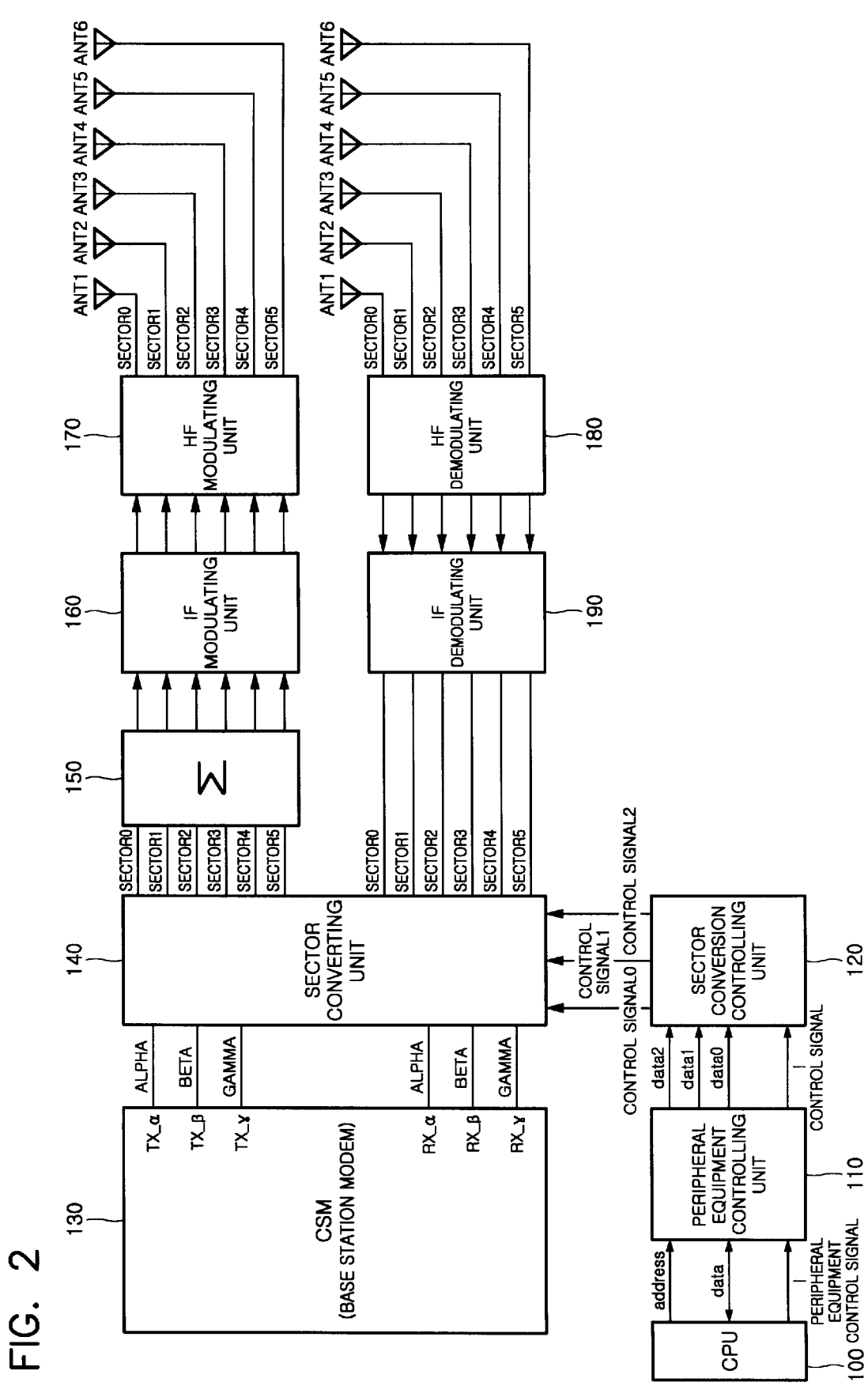
Figure 3:
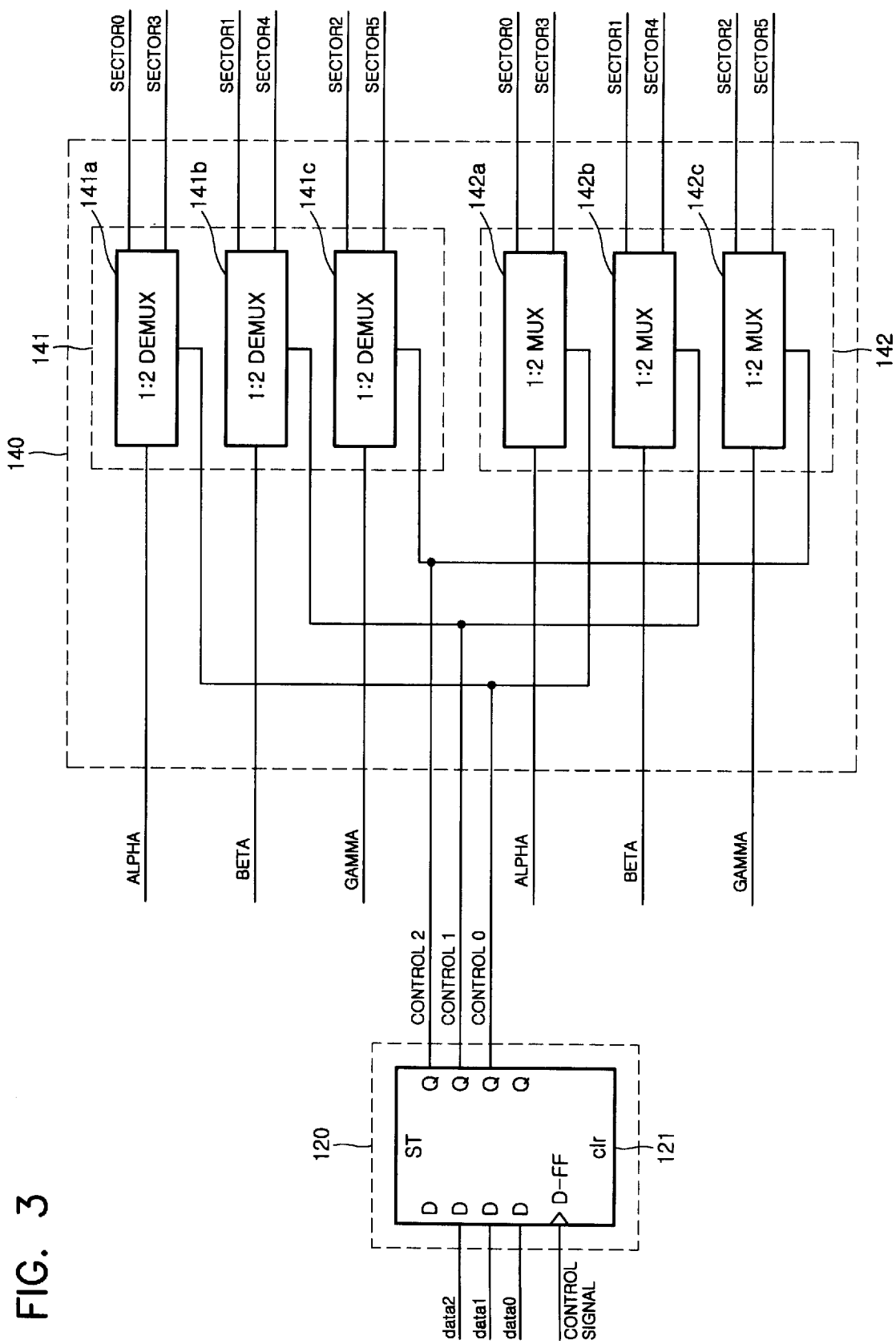

In the drawings:

FIG. 1 depicts a block diagram of a conventional three-sector base station apparatus;

FIG. 2 indicates a block diagram of a multi-sector base station apparatus in accordance with the present invention; and FIG. 3 illustrates a detailed block diagram of a controller and a sector converter shown in FIG. 3.

DETAILED DESCRIPTION OF PREFERRED EMBODIMENT

Reference will now be made in detail to the preferred embodiments of the present invention, examples of which are illustrated in the accompanying drawings.

FIG. 2 represents a block diagram of a multi-sector base station apparatus in accordance with the present invention.

As shown in this drawing, the multi-sector base station apparatus. includes a CPU 100 for controlling an overall operation of a base station; a peripheral equipment controlling unit 110 for transferring sector conversion control signals outputted from the CPU which controls an overall operation of the base station, to peripheral equipments; a sector conversion controlling unit 120 for generating a number of control signals provided for a sector conversion according to the control signals and sector conversion data, data0~data2, which are transmitted from the peripheral equipment controlling unit 110; a sector converting unit 140 for performing a switching for sectors of transmission signals from a base station MODEM 130 and reception signals transmitted from a mobile station, in response to numerous control signals generated in the sector conversion controlling unit 120; a base station MODEM output digital combining unit 150 for combining the transmission signals of the base station MODEM 130 provided from the sector converting unit 140 and outputting it; an intermediate frequency modulating unit 160 for modulating the transmission data per the sector into respective intermediate frequency signals, the transmission data being outputted from the base station MODEM output digital combining unit 150; a high frequency modulating unit 170 for modulating the intermediate frequency (IF) per each sector, which is gained from the intermediate frequency modulating unit 160, into each high frequency signal, and after that, outputting the signals to antennae ANT1,ANT2,ANT3,ANT4,ANT5,ANT6 per respective sectors; a high frequency demodulating unit 180 for demodulating high frequency(HF) received to the antenna ANT1,ANT2,ANT3,ANT4,ANT5,ANT6 per each sector, the high frequency being transmitted from the mobile station; and an intermediate frequency demodulating unit 190 for extracting the IF signals from the HF signals respectively demodulated in the HF demodulating unit 180 and transferring them to the sector converting unit 140.

As shown in FIG. 3, the sector converting unit 140 is composed of a transmitter 141 for converting a three-sector signal outputted from the base station MODEM 130 into a six-sector signal in response to numerous control signals outputted from the sector conversion controlling unit 120, and a receiver 142 for converting a six-sector reception signal transmitted from the mobile station into a three-sector signal.

In addition, the transmitter 141 is constructed by first through third demultiplexors 141a~141c for converting the three-sector signal outputted from the base station MODEM 130 into the six-sector signal.

The receiver 142 is also constructed by first through third multiplexors 142a~142c for converting the six-sector reception signal transmitted from the mobile station into the three-sector signal.

In the inventive multi-sector base station apparatus with such construction, individual base station MODEMs are first determined as overhead channels of respective sectors. Herewith, a plural number of base station MODEMs exist actually, though one base station MODEM is shown in the drawings.

That is, when a first base station MODEM is determined as an overhead channel of a sector "0", a transmission signal outputted from an alpha sector transmission terminal TX-α of a first base station MODEM is transmitted by the first demultiplexor 141a provided within the sector converting unit 140 through a path of the sector "0", and a reception signal of the sector "0" is received to an alpha sector reception terminal RX-α of the base station MODEM by the first multiplexor 142a.

In case that a second base station MODEM is determined as an overhead channel of a sector "1", a transmission signal outputted from a beta sector transmission terminal TX-β of a second base station MODEM is transmitted by the second demultiplexor 141b provided within the sector converting unit 140 through a path of a sector "1", and a reception signal of the sector "1" is received to a beta sector reception terminal RX-β of the base station MODEM by the second multiplexor 142b.

When a third base station MODEM is determined as an overhead channel of a sector "2", a transmission signal outputted from a gamma sector transmission terminal TX-γ of a third base station MODEM is transmitted by the third demultiplexor 141c provided within the sector converting unit 140 through a path of a sector "2", and a reception signal of the sector "2" is received to a gamma sector reception terminal RX-γ of the base station MODEM by the third multiplexor 142c.

In case that a fourth base station MODEM is determined as an overhead channel of a sector "3", a transmission signal outputted from the alpha sector transmission terminal TX-α of a fourth base station MODEM is transmitted by the first demultiplexor 141a provided within the sector converting unit 140 through a path of the sector "3", and a reception signal of the sector "3" is received to the alpha sector reception terminal RX-α of the base station MODEM by the first multiplexor 142a.

When a fifth base station MODEM is determined as an overhead channel of a sector "4", a transmission signal outputted from the beta sector transmission terminal TX-β of a fifth base station MODEM is transmitted by the second demultiplexor 141b provided within the sector converting unit 140 through a path of a sector "4", and a reception signal of the sector "4" is received to the beta sector reception terminal RX-β of the base station MODEM by the second multiplexor 142b.

When a sixth base station MODEM is determined as an overhead channel of a sector "5", a transmission signal outputted from the gamma sector transmission terminal TX-γ of a sixth base station MODEM is transmitted by the third demultiplexor 141c provided within the sector converting unit 140 through a path of a sector "5", and a reception signal of the sector "5" is received to the gamma sector reception terminal RX-γ of the base station MODEM by the third multiplexor 142c.

In such state that the overhead channels for six sectors are determined, transmission and reception procedures of actual sound channels are described as follows.

In an initial state, the CPU 100 outputs all control signals of the respective sectors as a low state, and these sector control data is transferred to the sector conversion controlling unit 120 via the peripheral equipment controlling unit 110.

Then, the sector conversion controlling unit 120 latches the sector data by using its inside D flip-flop 121, after that, controls first through third demultiplexors 141a~141c and first through third multiplexor 142a~142c, which are set inside the sector converting unit 140.

Herewith, when all the sector conversion control signals, namely, a control signal 0, a control signal 1 and a control signal 2, are the low state, an α a sector of the base station MODEM is connected to the sector "0", its β sector is connected to the sector "1" and its γ sector is connected to the sector "2".

When in this state, the mobile terminal (the mobile station) tries to execute a speech in the sector "3", a base station controller not shown in the drawings, recognizes that the mobile terminal is trying to attempt to call in the sector "3" through the overhead channel of the sector "3".

Then, the base station controller controls the CPU 100 so that a corresponding terminal can gain a speech in the sector "3", and by this control the CPU 100 generates a control signal so that the traffic channel is connected to the sector "3". This control signal is also transferred as the control data to the sector conversion controlling unit 120 via the peripheral equipment controlling unit 110.

In other words, the control signal for the traffic channel connection of the sector "3" is obtained by changing the control signal "0" from a low state to a high state, and in such changed high signal, the data "0" becomes the high signal (1) in the peripheral equipment controlling unit 110 and is transferred to the sector conversion controlling unit 120.

The sector conversion controlling unit 120 then latches the high signal through its own D flip-flop 121, after that, maintains the control signals "1" and "2" as a low state like before and outputs only the control signal "0" as the high signal to transfer it to the sector converting unit 140.

According to that, the transmitter 141 within the sector converting unit 140 connects a switch of the first demultiplexor 141a with the sector "3", thus the transmission signal from the α sector of the base station MODEM 130 is connected to the sector "3" through the first demultiplexor 141a.

Additionally, the receiver 142 connects a switch of the first multiplexor 142a with the sector "3" side, and according to this, the signal received to the sector "3" is transferred to the alpha sector reception terminal RX-α of the base station MODEM 130 through the first multiplexor 142a.

Herewith, operations in the base station MODEM output digital combining unit 150, the IF modulating unit 160 and the HF modulating unit 170 are same as the operations in the base station MODEM output digital combiner 3, the IF modulator 4 and the HF modulator 5 of the existing three-sector base station apparatus, and it is just different that respective signals are processed per the six-sectors.

Likewise, operations in the HF demodulating unit 180 and the IF demodulating unit 190 of the receiving part are same as operations in the HF demodulator 6 and the IF demodulator 7 of the existing three-sector base station apparatus, and it is only different that individual signals are processed per the six-sectors.

Meanwhile, when the mobile terminal tries to move to the sector "4" as the base station MODEM beta sector in the midst of a speech with the sector "3" as the base station MODEM alpha sector, the softer handoff occurs. At this time, the base station controller recognizes it and controls the CPU 100 to convert the current traffic channel as the sector "3", namely, the α sector, into the β sector.

Accordingly, the CPU 100 generates the control signal so that the traffic channel can be connected to the sector "4", and this control signal is transferred as the control data to the sector conversion controlling unit 120 via the peripheral equipment controlling unit 110.

That is, the control signal for the traffic channel connection with the sector "4" is gained by changing the control signal "1" from the low state to the high state, and in such changed high signal, the data "1" becomes the high signal (1) in the peripheral equipment controlling unit 110 and is transferred to the sector conversion controlling unit 120.

Then, the sector conversion controlling unit 120 latches it through its own D flip-flop 121, after that, outputs only the control signal "1" as a high signal and transfers it to the sector converting unit 140.

According to that, the transmitter 141 within the sector converting unit 140 connects a switch of the second D multiplexor 141b with the sector "4" side, thus the transmission signal from the β sector of the base station MODEM 130 is connected to the sector "4" through the second D multiplexor 141b.

In addition, the receiver 142 connects a switch of the second multiplexor 142b with the sector "4" side, and according to this, the signal received to the sector "4" is transferred to the beta sector reception terminal RX-β of the base station MODEM 130 through the second multiplexor 142b. Thereby a path of the traffic channel is switched and its speech can be maintained.

As afore-mentioned, in accordance with the present invention, there is an effect the six-sector base station apparatus can be realized with the three-sector base station MODEM.

Further, the inventive six-sector base station has an advantage in heightening a use efficiency of a traffic channel by allotting only one traffic channel through a switching operation, differently from an allocation of two channels used in the conventional technique, in an occurrence of a softer handoff provided in a case of a progression of a handoff between sectors.

It will be apparent to those skilled in the art that various modifications and variations can be made in the multi-sector base station apparatus of the mobile communication system of the present invention without deviating from the spirit or scope of the invention. Thus, it is intended that the present invention cover the modifications and variations of this invention provided they come within the scope of the appended claims and their equivalents.

What is claimed is:

1. A multi-sector base station apparatus in base station apparatuses of a mobile communication system which performs a communication on the basis of individual sectors by using a base station MODEM, said apparatus comprising:

peripheral equipment controlling means for transferring sector control data outputted from a central processing unit (CPU) for controlling a sector switching of a base station, to peripheral equipments;

sector conversion controlling means for generating a plurality of sector conversion control signals for a sector conversion according to control signals and said sector control data provided from the peripheral equipment controlling means; and sector converting means for performing a switching for sectors of a transmission signal from the base station MODEM and a reception signal transmitted from a mobile station, in response to said plurality of sector conversion control signals generated in said sector conversion controlling means, said sector converting means including, a transmitter having first through third demultiplexors for converting a three-sector signal outputted from the base station MODEM into a six-sector signal in response to said plurality of sector conversion control signals outputted from the sector conversion controlling means; and a receiver having first through third multiplexors for converting a six-sector reception signal transmitted from the mobile station into a three-sector signal.

2. The apparatus of claim 1, wherein said sector conversion controlling means includes a D flip-flop for latching said sector control data and thereafter controlling said first through third demultiplexors and said first through third multiplexors.

3. The apparatus of claim 2, wherein said plurality of sector conversion control signals includes a first control signal, a second control signal and a third control signal, each of said first, second and third control signals having a high state and a low state for controlling a respective one of said first, second and third demultiplexors and a corresponding one of said first, second and third multiplexors.

4. The apparatus of claim 3, wherein each of said first, second and third demultiplexors and each of said first, second and third multiplexors supports communication in two of said six sectors.

5. The apparatus of claim 4, wherein said first demultiplexor and said first multiplexor support communication in a first sector when said first control signal is a low state, and support communication in a second sector when said first control signal is a high state.

6. The apparatus of claim 3, wherein said base station MODEM has an α sector, a β sector and a γ sector, said first control signal controlling said first demultiplexor and said first multiplexor, said second control signal controlling said second demultiplexor and said second multiplexor, and said third control signal controlling said third demultiplexor and said third multiplexor, such that when each of said control signals is in a low state, said α sector is connected to a first sector, said β sector is connected to a second sector and said γ sector is connected to a third sector, when said first control signal is in a high state said α sector is connected to a fourth sector, when said second control signal is in a high state said β sector is connected to a fifth sector, and when said third control signal is in a high state, said γ sector is connected to a sixth sector.

* * * * *